(12) United States Patent
Oraw et al.

(10) Patent No.: US 7,696,735 B2
(45) Date of Patent: Apr. 13, 2010

(54) SWITCHED CAPACITOR CONVERTERS

(75) Inventors: Bradley S. Oraw, Mesa, AZ (US); Pavan Kumar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 374 days.

(21) Appl. No.: 11/694,391

(22) Filed: Mar. 30, 2007

(65) Prior Publication Data

US 2008/0239772 A1 Oct. 2, 2008

(51) Int. Cl.
*G05F 1/40* (2006.01)
(52) U.S. Cl. ...................................... 323/282
(58) Field of Classification Search ................. 323/265, 323/273, 282, 351; 363/59, 60
See application file for complete search history.

(56) References Cited

U.S. PATENT DOCUMENTS 6,853,569 B2 * 2/2005 Cheng et al. .................. 363/97
7,271,626 B1 * 9/2007 Burinskiy et al. ............ 327/108

* cited by examiner

*Primary Examiner*—Adolf Berhane
(74) *Attorney, Agent, or Firm*—Grossman, Tucker, Perreault & Pfleger, PLLC

(57) ABSTRACT

A switched capacitor converter has a supply voltage input, an output circuit with one or more load capacitors, a semiconductor switch network. The switch network is connected at a switch junction point and across the voltage input, and has one or more pairs of said first and second switches. Each pair of switches is associated with one of the load capacitors and each pair is connected in series. The converter also has a charging capacitor network connected across the semiconductor switch network and across the voltage input. The charging capacitor network has one or more charging capacitors and inductances connected between the switch junction point and the output circuit. Each of the charging capacitors and inductances is associated with one of the load capacitors. The load capacitors are each charged by the associated charging capacitor when the associated first switch is closed and the associated second switch is open. And the load capacitors are each discharged by the associated inductance when the associated first switch is closed and the associated second switch is open.

14 Claims, 20 Drawing Sheets

SWITCHED CAPACITOR CONVERTERS

FIELD

The present disclosure relates to switched capacitor networks for generating voltage conversions. Specifically, this disclosure provides embodiments of high efficiency front end switched capacitor converter circuits for use in computing platforms to generate single output or multiple regulated output voltage rails.

BACKGROUND

Switched capacitor converters, often referred to as "charge pumps", are generally used for conversion of DC voltages. Basic switched converters generally provide one simple voltage conversion. The most common applications for these circuits are to provide a single output voltage signal that is a doubled, halved or inverted form of the an input voltage signal.

Personal computing devices in general are trending towards smaller sizes while the number of feature sets associated with consumer demands is increasing. The need for single small packages and circuits capable of providing a growing number of voltage conversions in the form of numerous output signals from a single input signal increases with each micro technological advance. Thus there is an as yet unsatisfied need for a power network that efficiently, compactly and cost effectively provides a multitude of various voltage signal conversions.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

This disclosure describes various switched capacitor front end circuits for generating single output or multiple regulated output voltage rails. This disclosure teaches novel switched capacitor networks which are compact, efficient and low cost. In general, these circuits are more efficient and compact as compared to conventional cascaded buck converter applications. The disclosed circuits are categorized according to the number of voltage levels and number of conversion stages, each with different switched capacitor front ends.

Figure 1:
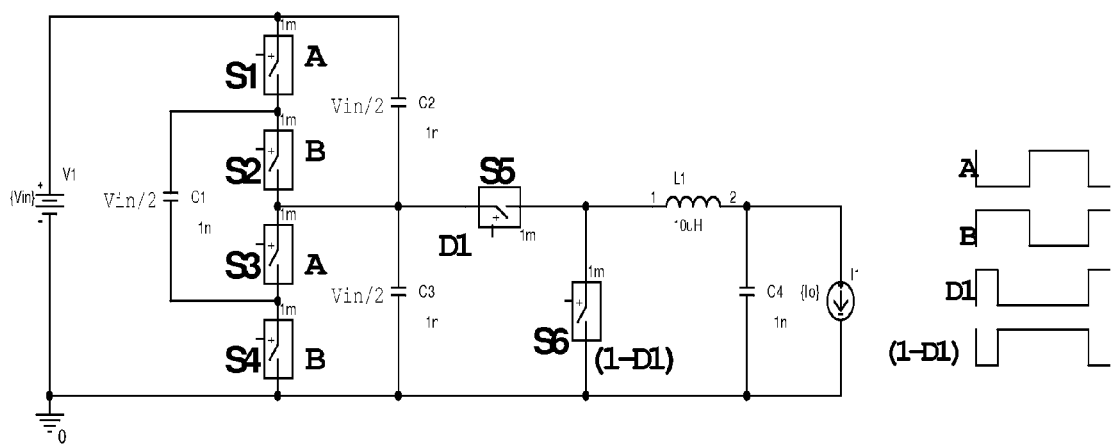
FIG. 1 is a circuit diagram for a two stage three level switch capacitor voltage divided single rail single output buck converter and typical gate signals.
Figure 2:
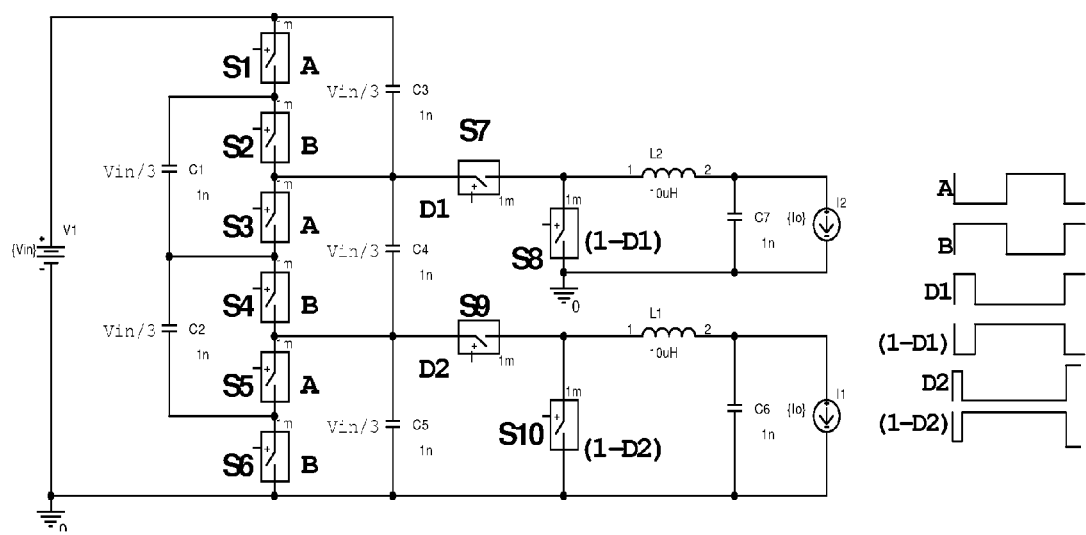
FIG. 2 is a circuit diagram for a two stage four level switch capacitor voltage divided dual rail dual output buck converter according to the disclosure, with typical gate signals.
Figure 3:
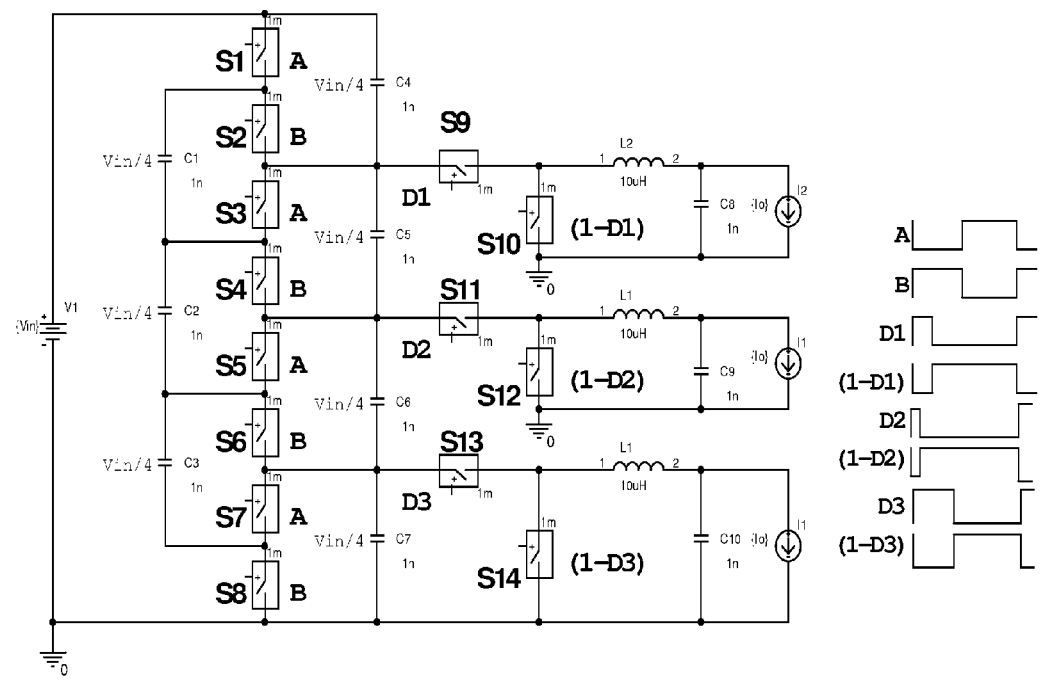
FIG. 3 is a circuit diagram for a two stage five level switched capacitor voltage divided tri-rail tri-output buck converter according to the disclosure, with typical gate signals.

FIG. 1 shows the state of the art in terms of a single output in a 2 stage converter with the first stage being a switched capacitor voltage divider. There are two stages in the converter. The first stage consists of four switches (S1 through S4) and the second stage has two switches S5 and S6. Switches S1 and S3 are turned ON at the same time for half the time (50% duty cycle depicted by A), while switches S2 and S4 are turned ON out of phase with S1 and S3 for the other half of the time (depicted by B). This results in a voltage Vin/2 to appear across each of the three capacitors C1, C2 and C3. The second stage is a conventional buck converter which uses the voltage across C3 as its input to provide a regulated voltage at its output with a duty cycle D1. Extending this concept, FIG. 2 and FIG. 3 show circuit configurations which deliver multiple voltages. The second stages are all inductor based buck converters. The first stage is derived from an extension of the voltage divider network shown in FIG. 1.

Referring to FIGS. 2 through 20, numerous circuits are provided in accordance with the present disclosure. In each figure typical gate signal waveforms are shown, but other modes of operation are also anticipated. Prior voltage divider switch capacitor networks are typically used to generate a single lower voltage (such as voltage halving where Vo=Vin/2) as a first stage in a two stage power converter. While such a configuration provides for a converter that is compact and efficient as compared to cascaded buck converter stages, each desired output voltage rail requires either one buck converter or two cascaded converters. The circuits shown in FIGS. 2 through 20 deliver multiple voltage levels to the different rails on a computing platform. Such circuits provide a means to reduce the cost of future platform power components while delivering highly efficient power solutions. Multiple variations of switched capacitor networks are disclosed to generate single and multiple voltage rails.

2 Stage Switched Capacitor Voltage Divided Multi Rail Multi Output Converters

In FIG. 2 another capacitor divider block (comprising two switches S5 and S6 and two capacitors C2 and C5) is used to divide the input voltage by parts. In this case, the voltage appearing across each capacitor is equal to one-third of the input voltage. This fraction (Vin/3) is further reduced to the desired output voltage by the second stage buck converter circuit. In FIG. 3 this concept is extended to cover voltage division to one-fourth of the input voltage. This principle can be extended to an infinite ladder of switches and capacitors resulting in a "Vin/N" voltage to appear across each capacitor. Thus with each combination of switch capacitor network, one may obtain an additional output. The reduced input voltage results in a smaller conversion ratio for the second buck stage which in turn results in higher overall efficiency. The first stage switches are always switched in terms of equal duty cycles, (such as 50%). The first stage does not provide any regulation. The regulation for the output is provided by duty cycle control (D2, D3, etc) of the second stage (buck converter stage). These circuits are inherently more compact and efficient than conventional cascaded multiple output converters.

The voltage levels occurring at various points within the switched capacitor front end is a fraction of the input voltage. The efficiency of the second stage may be made considerably higher with appropriate voltage levels at their inputs by the use of the switched capacitor front end which is inherently efficient. In addition, the switch capacitor network may be implemented as a functional block which may be repeated where needed.

Single Stage Switched Capacitor Voltage Divided Multi Phase Multi Output Converters The circuits of FIGS. 4 through 8 illustrate a new class of converters with switched capacitor front ends for single stage applications. The duty cycle ratios required to operate the converter are indicated on each diagram to achieve the required output levels. The 2 stage switched capacitor circuits shown in FIGS. 2 through 3 do not provide output voltage regulation in the first stage. The regulation is provided by the buck converter stage (second stage).

Figure 4:
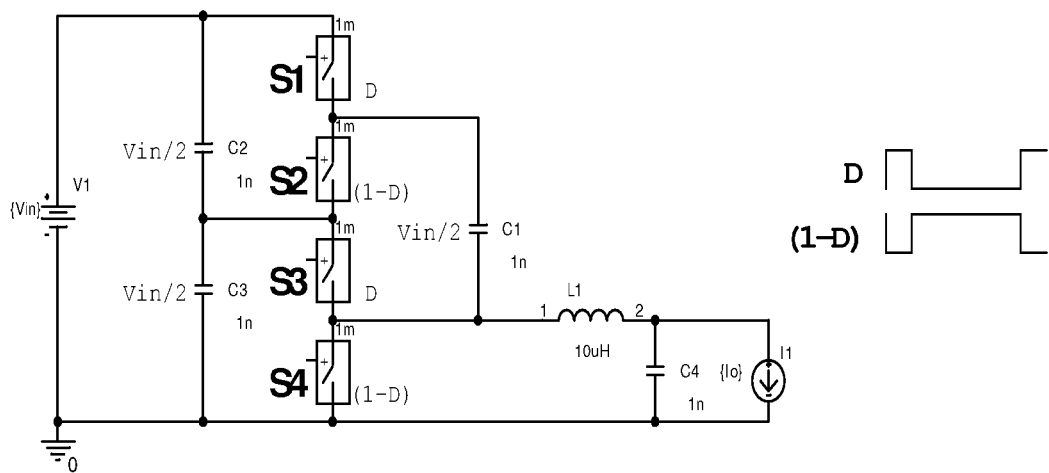
FIG. 4 is a circuit diagram for a single stage three level switched capacitor voltage divided single output buck converter according to the disclosure, with typical gate signals.
Figure 5:
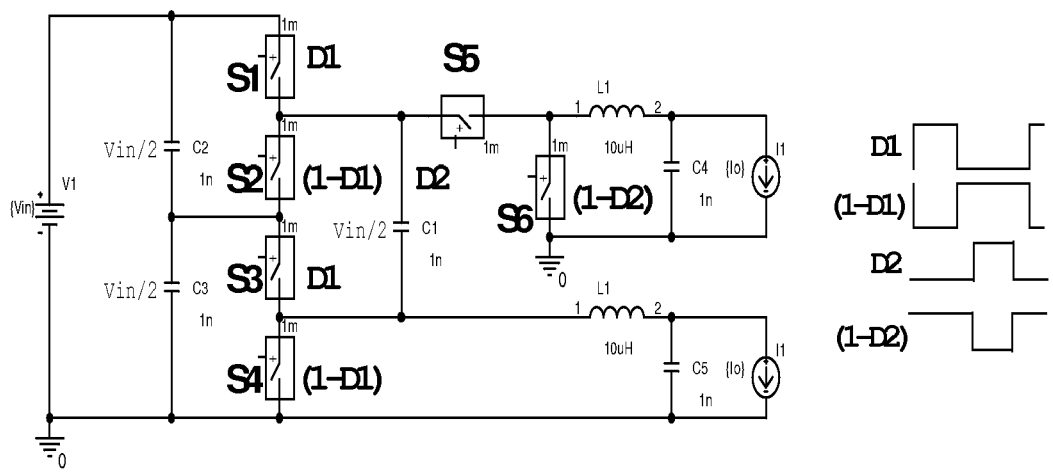
FIG. 5 is a circuit diagram for a single stage three level switched capacitor voltage divided dual output buck converter according to the disclosure, with typical gate signals.
Figure 6:
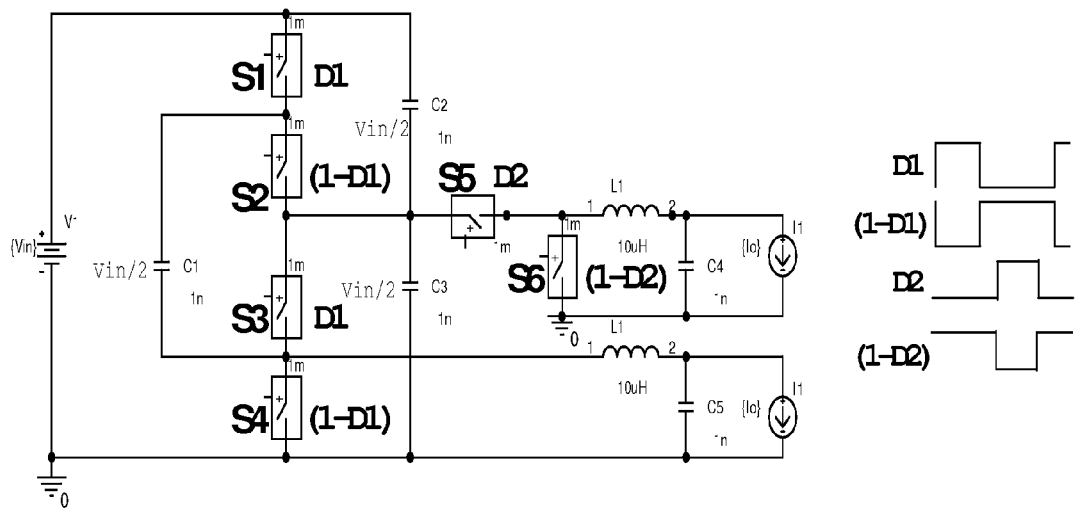
FIG. 6 is a circuit diagram for a single stage three level switched capacitor voltage divided dual output buck converter according to the disclosure, with typical gate signals.

FIG. 4 shows a circuit topology that is a modification of a voltage divider network that provides regulation at its output. At 50% duty cycle {D=(1−D)=0.5} all the capacitors in the circuit are charged to half the input voltage (Vin/2). The input voltage of the inductor will be at Vin/2 for a duration equal to the duty cycle "D" when switches S1 and S3 are ON, and will be at ground potential for a duration (1−D) when switches S2 and S4 are ON. This results in a "buck" type operation for the converter. The output inductor L1 and C4 perform the low pass filtering function resulting in a regulated voltage at the output. Thus, the efficiency of the converter can be maintained by using a single converter stage rather than two cascaded stages as depicted in FIGS. 2 through 3. The principle explained for FIG. 4 can be used in conjunction with a cascaded 2 stage converter to obtain multiple outputs as depicted in FIGS. 5 through 9.

Figure 7:
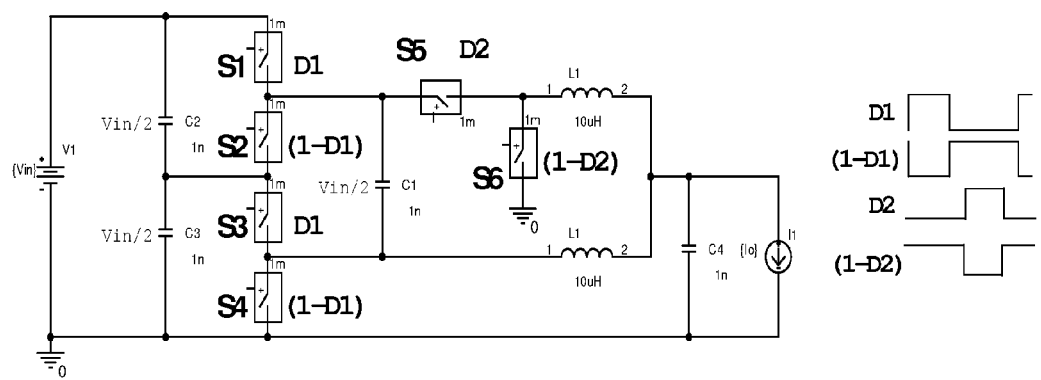
FIG. 7 is a circuit diagram for a single stage three level switched capacitor voltage divided 2-phase interleaved single output buck converter according to the disclosure, with typical gate signals.
Figure 8:
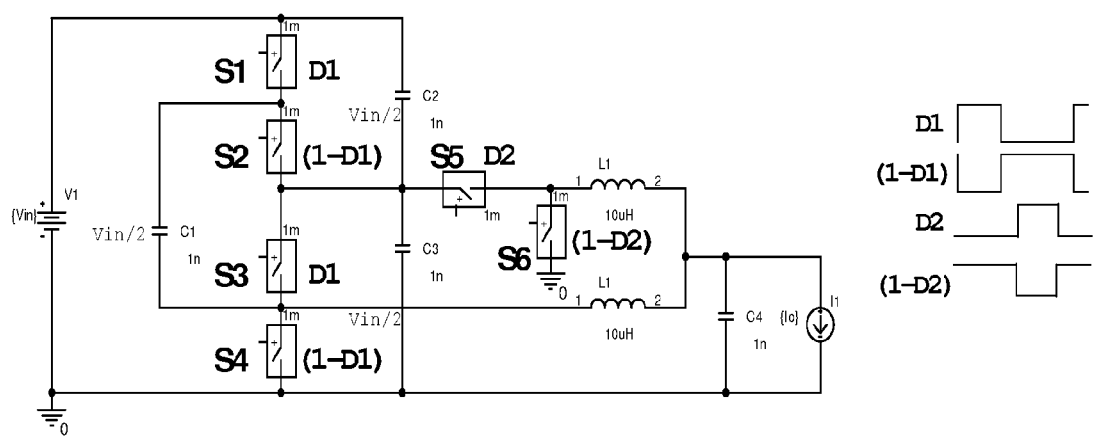
FIG. 8 is a circuit diagram for a single stage three level switched capacitor voltage divided 2-phase interleaved single output buck converter according to the disclosure, with typical gate signals.

FIGS. 7 and 8 shows a unique implementation for a single regulated output case where the output is derived as an interleaved combination of two outputs. The two inductors at the output of each stage see a voltage that is out of phase with respect to one another. The average voltage across the inductors is seen at the output.

Figure 9:
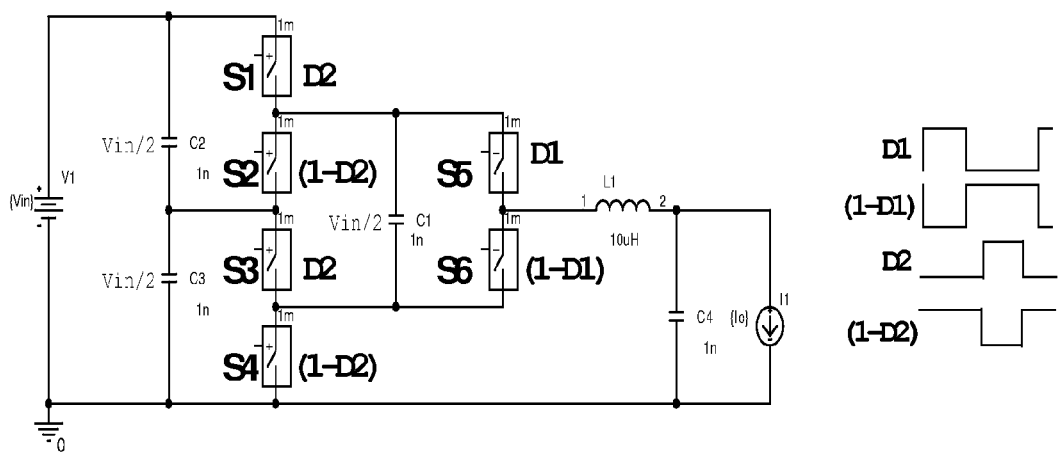
FIG. 9 is a circuit diagram for a three level switched capacitor single output buck converter according to the disclosure, with typical gate signals.

FIG. 9, shows a 2 stage converter where, the second stage is placed across capacitor C1. The first stage and the second stage are operated one hundred and eighty degrees out of phase. The first stage has a duty cycle D2 which can be 50% (or any other level less than 50%) resulting in Vin/2 voltages across each of the capacitors C1, C2 and C3. The second stage uses the voltage across the capacitor C1 as input and regulates the output voltage with duty cycle D1 with switch S3. Thus the output voltage is regulated, as opposed to the circuit topology of FIG. 1.

Multi Level Switched Capacitor Multi Phase Multi Output Converters

Figure 10:
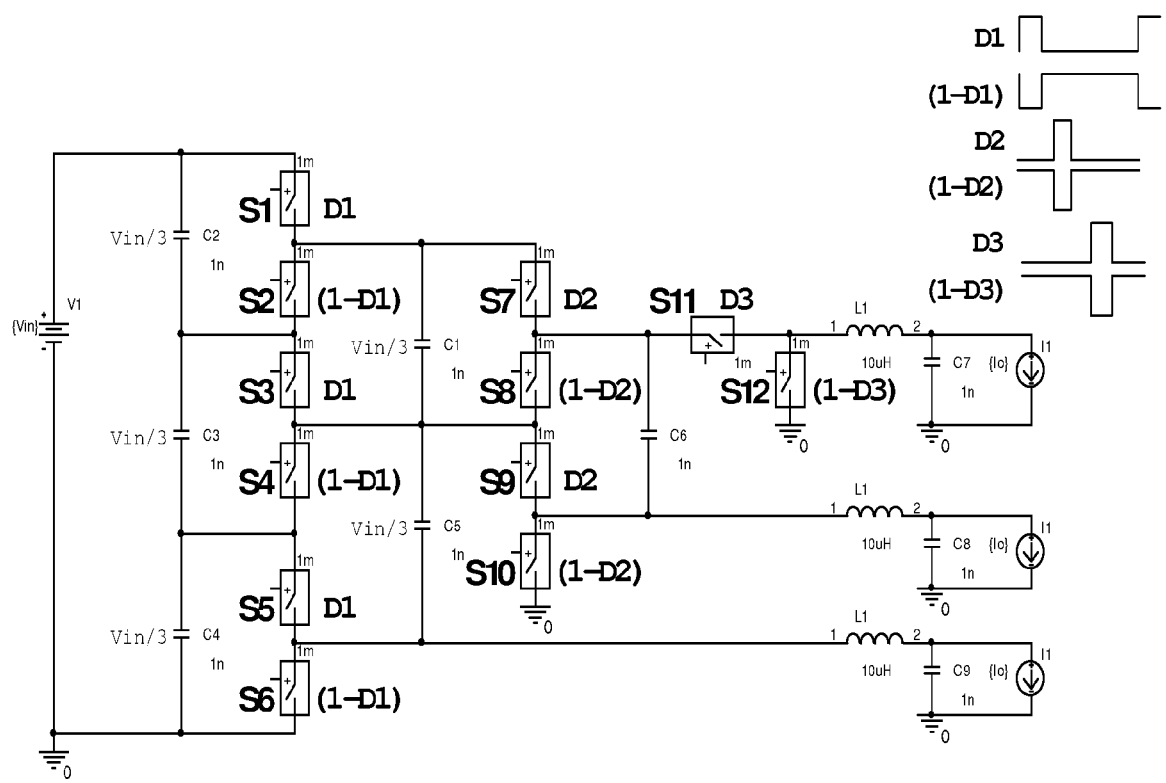
FIG. 10 is a circuit diagram for a four level switched capacitor tri-output buck converter according to the disclosure, with typical gate signals.
Figure 11:
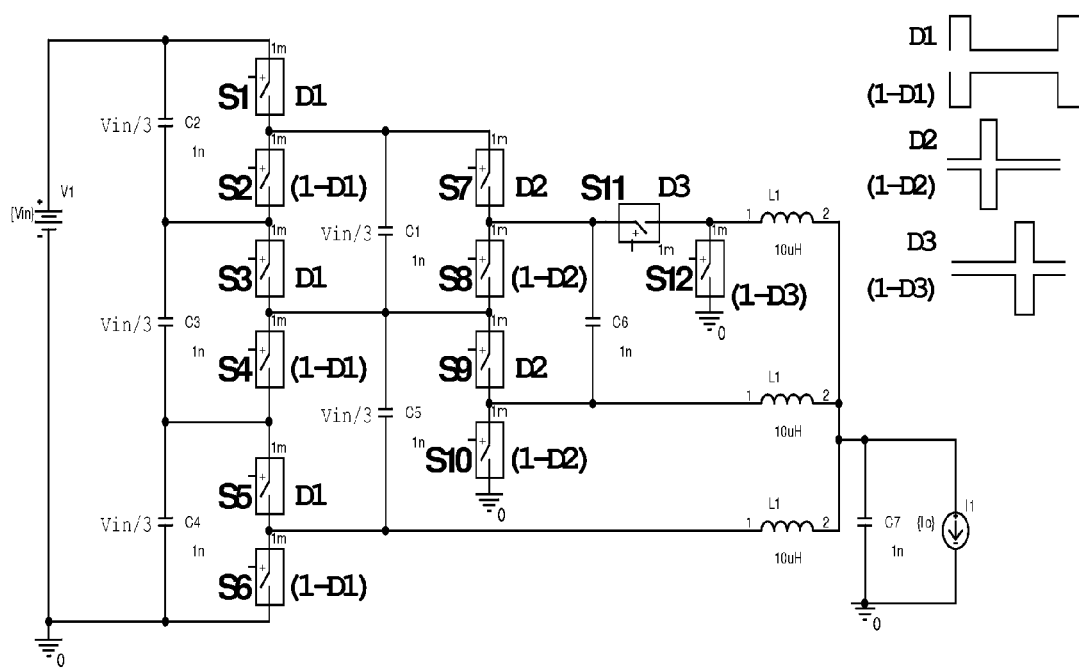
FIG. 11 is a circuit diagram for a four level switched capacitor 3-phase interleaved buck converter according to the disclosure, with typical gate signals.

The concept shown in FIGS. 4 through 9 may be extended to multiple levels and multiple phase converters resulting in multiple outputs, as shown in FIGS. 10 through 11. In these types of circuits, the front end may be common for multiple outputs, resulting in reduced losses to keep the entire network operating so that the switched capacitor network may operate efficiently.

FIG. 10 shows a circuit topology where the switch capacitor cells depicted by S1-S6 and capacitors C1-C5 divide the input voltage to Vin/3. Switches S1-S7 are controlled with a duty cycle D1 and (1−D1) as appropriate. The second voltage divider comprising switches S7-S10 further reduce the voltage Vin/3 to a smaller value as determined by the duty cycle D2 resulting in a reduced voltage value across the capacitor C6. The buck converter circuit comprising of switches S11 and S12 regulates the output voltage across output capacitor C7. The other outputs across C8 and C9 are also regulated due to the overlapping nature of the duty cycles depicted by D1, D2 & D3. FIG. 11 has a similar operation as explained in FIG. 10, except for the fact that all the input voltages across the inductors is summed up due to the interleaved nature of the circuit, resulting in one single regulated output across C7.

Multi Level Switched Capacitor Multi Phase Multi Output Converters with Reduced Switch Quantities The multi level switched capacitor network such as those of FIGS. 4 through 9 may alternatively be constructed with fewer semiconductor switches to reduce cost. Such converter circuits are shown in FIGS. 12 through 15. The converters utilize the voltage across one of the fixed capacitors. This fixed capacitor provides a constant bus voltage for multiple output or multiple phases. The primary output or primary phase uses the switched capacitor network as buck switches like the single stage converter in FIG. 8.

Figure 12:
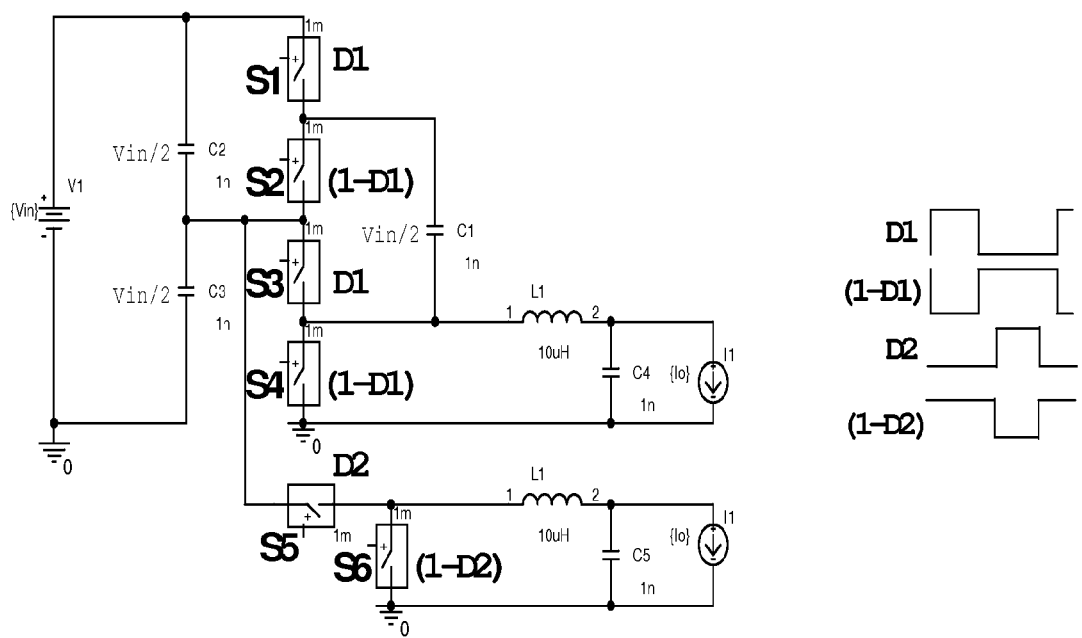
FIG. 12 is a circuit diagram for a three level switched capacitor dual output buck converter according to the disclosure, with typical gate signals.

FIG. 12 shows a multiple output circuit wherein the fixed voltage of Vin/2 across capacitor C3 is utilized to derive two regulated output voltages. Switches S5 and S6 form the switching elements of a buck converter output which operate with a duty cycle of D2. The output across C5 is a buck derived voltage determined by Vin/2 and D2. The voltage across C4 is also a buck derived output determined by Vin/2 and the duty cycle D1. Thus two output voltages are obtained by using less switches as opposed to previous switched capacitor networks.

Figure 13:
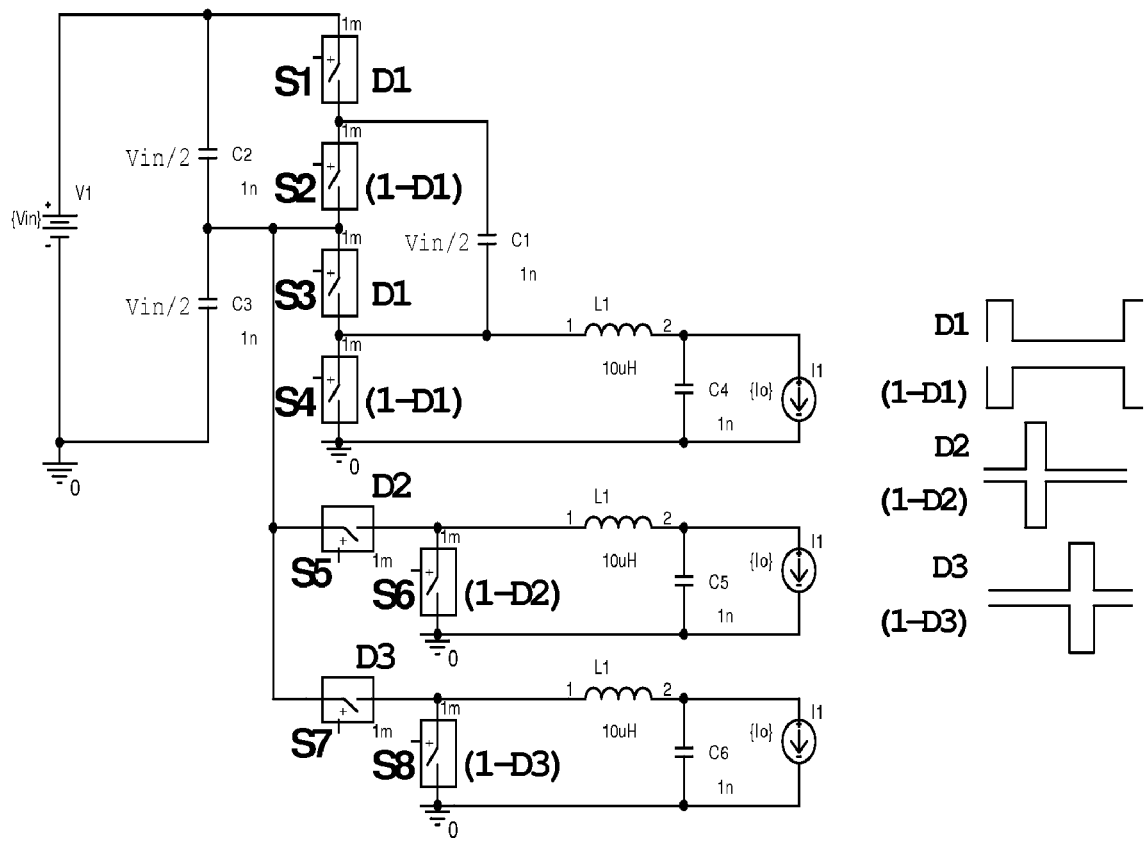
FIG. 13 is a circuit diagram for a four level switched capacitor tri-output buck converter according to the disclosure, with typical gate signals.
Figure 14:
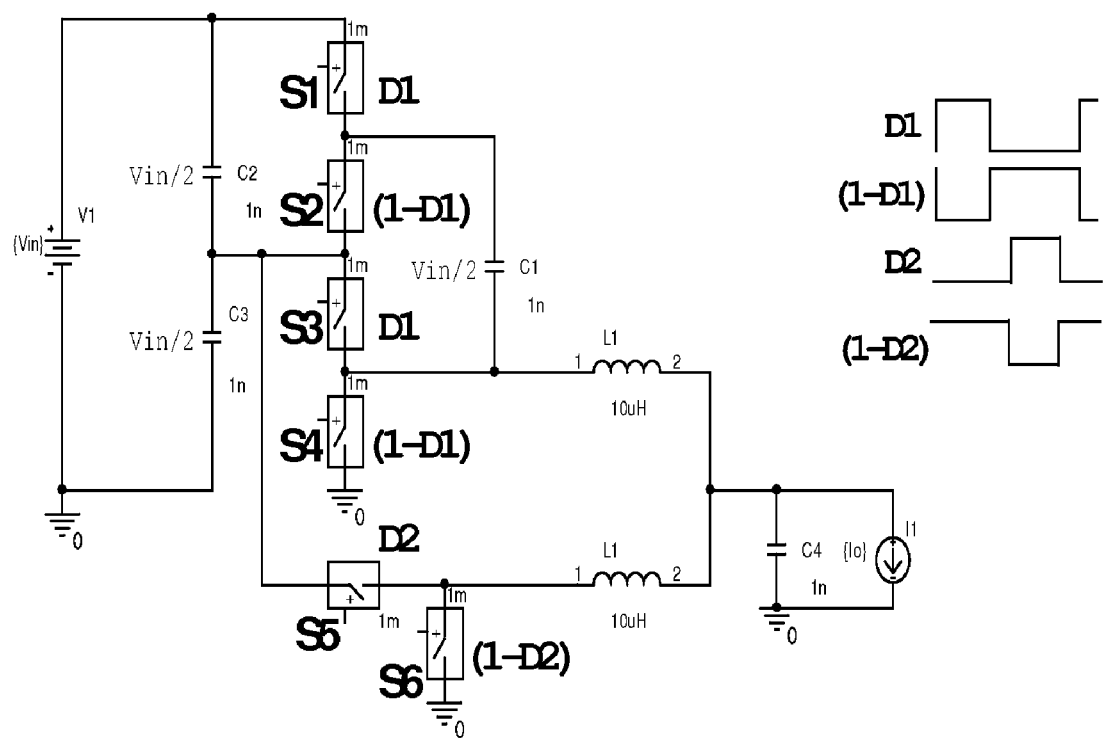
FIG. 14 is a circuit diagram for a three level switched 2-phase interleaved buck converter according to the disclosure, with typical gate signals.
Figure 15:
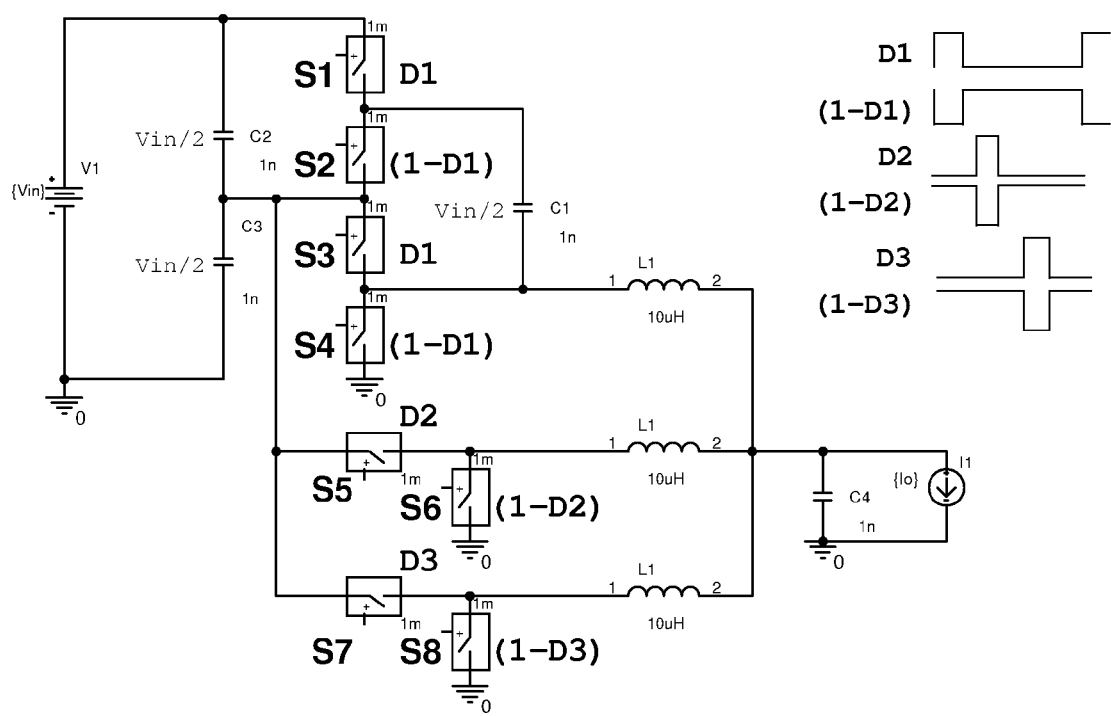
FIG. 15 is a circuit diagram for a four level switched capacitor 3-phase interleaved buck converter according to the disclosure, with typical gate signals.

FIG. 13 operates similar to FIG. 12 except that three output voltages are derived with a fixed input voltage of Vin/2 across capacitor C3. There are three buck derived circuits that are independently controlled by duty cycles D1, D2 and D3 respectively. FIG. 14 shows an interleaved configuration where in the two buck derived outputs are interleaved using inductors resulting in a single output as opposed to two separate outputs as was shown in FIGS. 12 and 13. FIG. 15 extends the interleaving concept to the three inductor case resulting in a single output. This configuration is an extension of FIG. 14. The control elements remain similar to that of FIG. 14.

Figure 16:
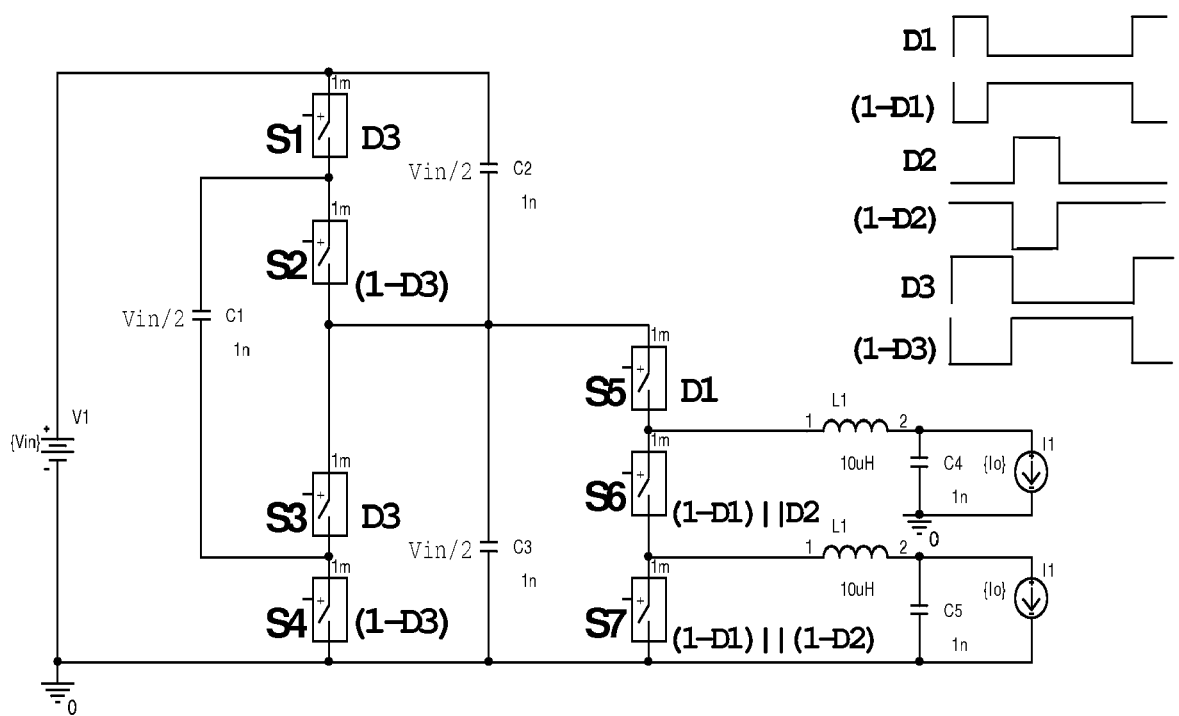
FIG. 16 is a circuit diagram for a two stage switched capacitor voltage divided 3 switch 2 output buck converter according to the disclosure, with typical gate signals.
Figure 17:
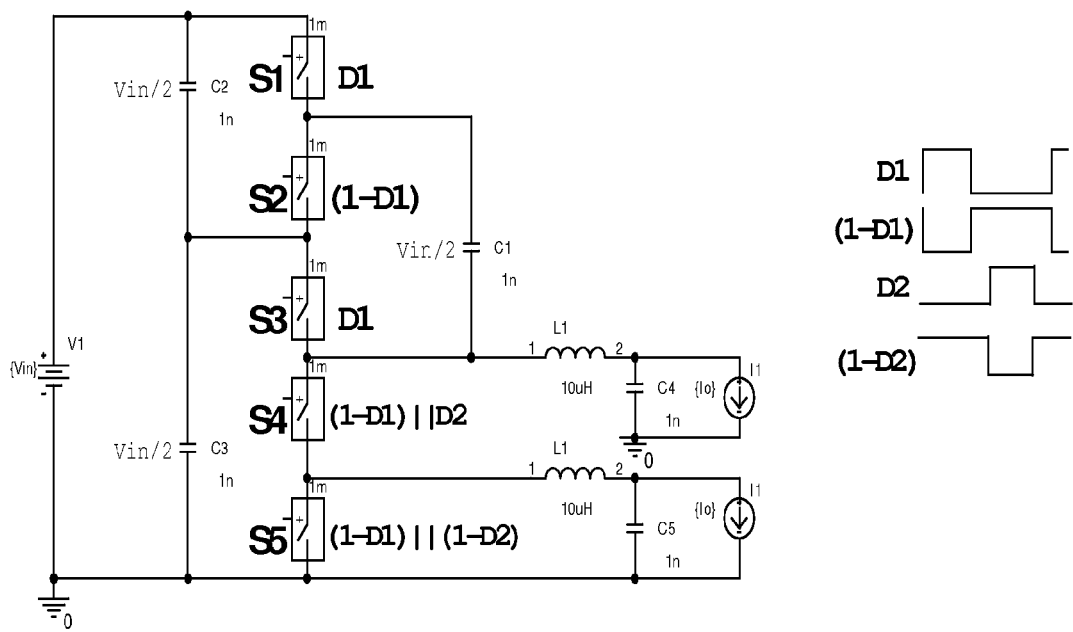
FIG. 17 is a circuit diagram for a single stage switched capacitor 3 switch 2 output buck converter according to the disclosure, with typical gate signals.

Three Level Switched Capacitor 3 Switch 2 Output Buck Converters 3 switch dual output buck converters have been used to develop multiple outputs. FIGS. 16 and 17 show shows two circuits that can achieve the same outcome by using switched capacitor front ends to overcome certain transient response problems, if those develop in 3 switch dual output converters, and to reduce switching losses. The switched capacitor voltage dividers reduce the switching voltage. This reduced switching voltage results in extended duty ratio and hence extends the dynamic range of the 3 switch converter, which improves transient response. The reduced switching voltage also reduces switching losses which translates to improved light load efficiency.

A 3 switch dual output buck converter is a portion of the circuit of FIG. 16, comprised of switches S5, S6 and S7. Such a configuration, if directly using a fixed input voltage of Vin, results in limited transient response for the second output across capacitor C5. Thus a larger duty cycle is needed to improve the transient behavior. This can be achieved as shown in FIG. 16 by reducing the input voltage to the 3 switch converter by using the switched capacitor voltage divider. In this case, switches S1 through S4, along with capacitors C1-C3, are operated at 50% duty cycle (or any other duty cycle less than 50%) resulting in a voltage Vin/2 across C3. This voltage is used as an input to the 3 switch dual output buck converter resulting in a doubling of the duty cycle. This increased duty cycle increases the capacity of the 3 switch converter to meet transient requirements of the output of C5.

FIG. 17 meets the same requirements of transient response increase as that of FIG. 17. In this case the input to the 3 switch converter (comprised of switches S3-S5) is still fixed at Vin/2 (across capacitor C3). However the input to the higher output through capacitor C1 provides additional duty cycle increase that helps in meeting transient requirements.

Switched Capacitor Voltage Divided Multi Input Voltage Rail Converters

Figure 18:
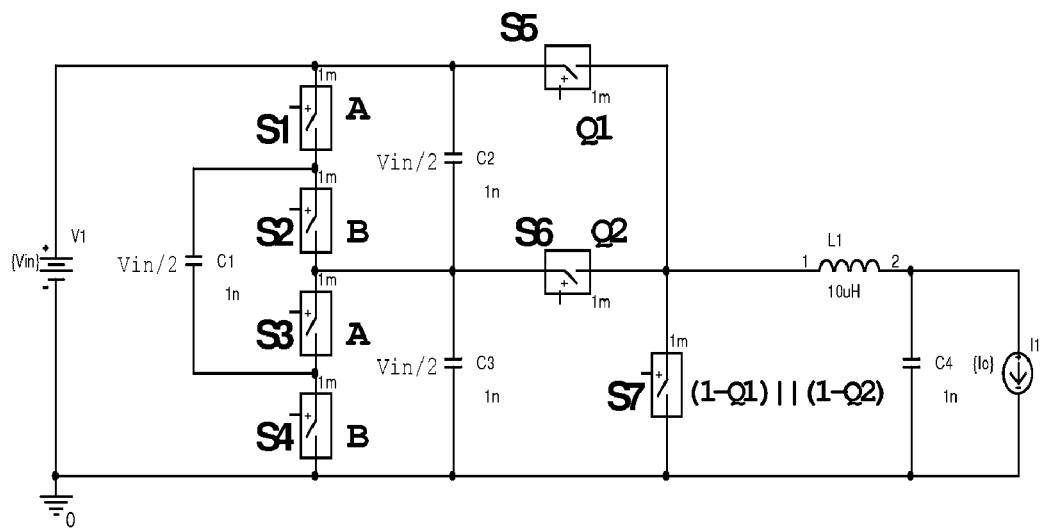
FIG. 18 is a circuit diagram for a switched capacitor voltage divided dual input rail buck converter.
Figure 19:
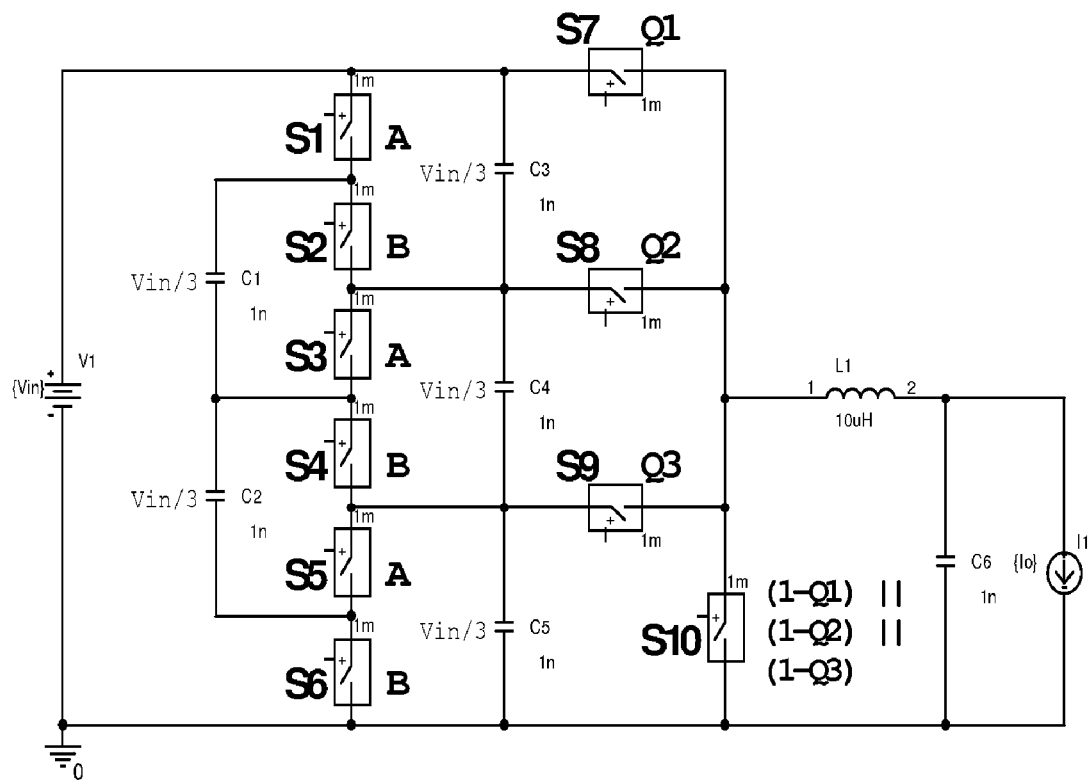
FIG. 19 is a circuit diagram for a switched capacitor voltage divided 3 input voltage rail buck converter.
Figure 20:
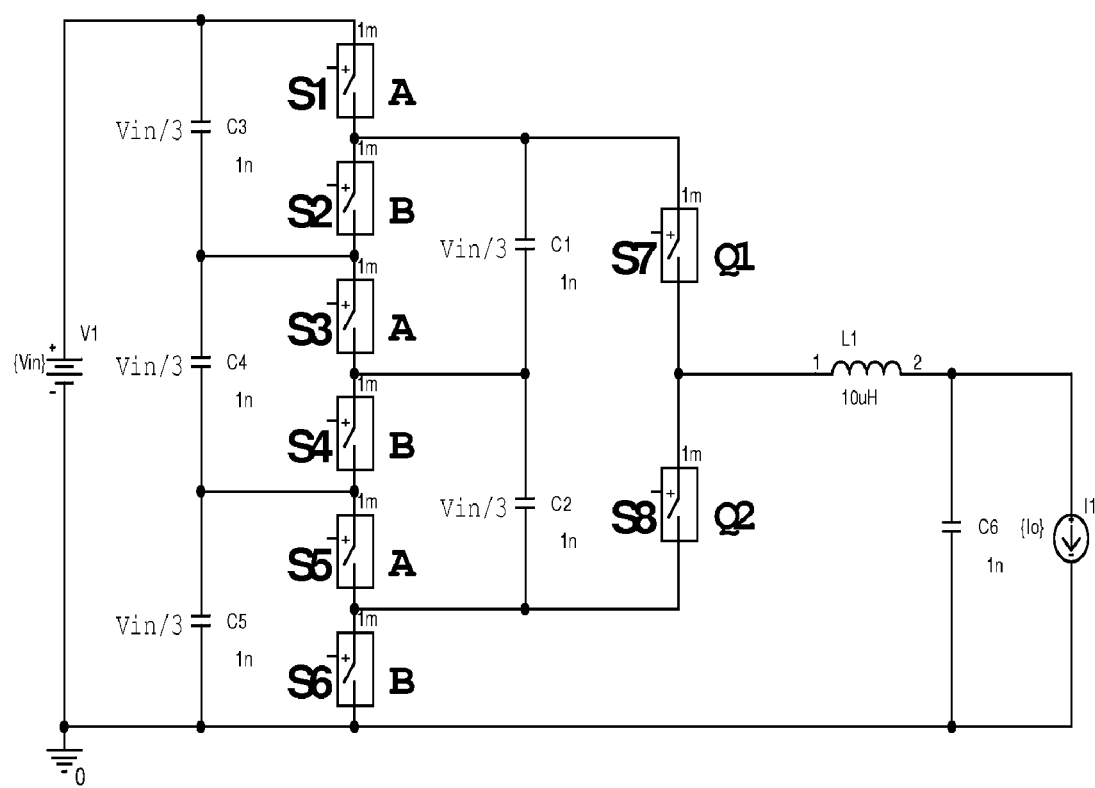
FIG. 20 is a circuit diagram for a four level switched capacitor 3 input voltage rail buck converter.

FIGS. 18 through 20 show switched capacitor topologies that provide multiple output rails. The switched capacitor networks divide the input voltage into several rails. The control switches select the desired rail and apply the rail voltage to the input of the output filter inductor. Existing circuit configurations which have switched capacitor networks only performing voltage division require more switches, whereas the multi level switched capacitor configurations of FIGS. 19 and 20, while having fewer switches, require two switches in series to connect to each rail, which results in higher conduction losses. Hence, there is a tradeoff between the number of switches and the conduction losses. The different proposed topological variations of these switched capacitor networks can provide benefit in terms of efficiency and space.

FIG. 18 has two stages of conversion. The first stage, comprised of switches S1-S4, is a simple voltage divider operating at 50% duty cycle (denoted by A and B). The additional switches S5 and S6 simply provide a mechanism where different input voltages can be gated as inputs to the inductor L1. When S5 is turned ON, a value of Vin is available at the input of the inductor. If S6 is gated, a value of Vin/2 is available at the input of the inductor. The durations for which these voltage levels are maintained at the terminals of the inductor determine the average voltage of the output across C4. Switch S7 is operated in a complementary fashion depending on the gating signals of either S5 or S6.

FIGS. 19 and 20 extends this principle to a higher number of input voltages. The second stages switches S7 to S10 in FIG. 19 and S7 and S8 in FIG. 20 respectively simply gate the various levels of the input voltage to the input terminals of the inductor. The output voltage across C6 in FIGS. 19 and 20 can be regulated by a combination of the various voltages levels at the input of the inductor along with simple duty cycle control.

The proposed circuits may offer numerous advantages over existing methods of achieving multiple output voltages in any system, including:

1) Providing a compact converter as compared to two or more distinct converters, or conventional cascaded buck converter implementations to derive multiple outputs.

2) Providing a method to power multiple devices in a reduced amount of area on a platform, 3) Providing an inexpensive solution for powering multiple devices on a platform, 4) Providing a method to improve the overall efficiency of the converter since average load on the converter from both the outputs can be maintained (Both outputs in general are not at high output states at the same time), 5) Minimizing the control and drive requirements of the converter, making it more compact and less expensive, 6) Providing simpler architecture for implementing multiple power outputs for devices on a platform, 7) Reducing system costs to achieve higher profits on such a system, 8) Providing a compact & inexpensive method to power multiple voltage outputs on such things as small handheld devices, mobile systems, wireless systems, and communication circuits, and 9) In the case the of multiple output 2 stage circuits, the common first stage may result in higher system efficiency since the first stage is shared by multiple second stages and provides a power averaging effect.

Various features, aspects, and embodiments of switched capacitor converter circuits have been described herein. The features, aspects, and numerous embodiments described are susceptible to combination with one another as well as to variation and modification, as will be understood by those having skill in the art. The present disclosure should, therefore, be considered to encompass such combinations, variations, and modifications. Additionally, the terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A switched capacitor converter comprising:
   an output circuit comprising a load capacitance, wherein said output circuit comprises a plurality of load capacitors;
   a semiconductor switch network connected at a switch junction point; said network being connected across a voltage input, wherein said semiconductor switch network comprises a plurality of pairs of said first and second switches, each pair associated with one of said load capacitors; and
   a charging capacitor network connected across said semiconductor switch network and across said voltage input, and comprising a charging capacitance and an inductance connected between said switch junction point and said output circuit, wherein said charging capacitor network comprises a plurality of charging capacitors each associated with one of said load capacitors;
   wherein said load capacitance is charged by said charging capacitance when a first switch of said semiconductor switch network is closed and a second switch of said semiconductor switch network is open, said load capacitance is discharged by said inductance when said first switch is closed and said second switch is open, and each of said load capacitors is charged by said associated charging capacitors when said associated first switch is closed and said associated second switch is open.

2. The switched capacitor converter of claim 1 wherein said first and second switches are connected in series at said switch junction point.

3. The switched capacitor converter of claim 2 wherein said charging capacitor network is connected across said first and second switches.

4. The switched capacitor converter of claim 1 wherein said first and second switches are connected in series at said switch junction point.

5. The switched capacitor converter of claim 4 wherein said charging capacitor network is connected across said first and second switches.

6. The switched capacitor converter of claim 1 wherein each charging capacitor is connected across said associated pair of first and second switches.

7. The switched capacitor converter of claim 6 wherein said first and second switches of each pair of are connected in series.

8. The switched capacitor converter of claim 7 wherein each charging capacitor is connected across said associated switch pair.

9. A method of switched capacitor conversion in a circuit, comprising:
   a supply voltage input;
   an output circuit comprising a load capacitance, wherein said output circuit comprises a plurality of load capacitors;
   a semiconductor switch network connected at a switch junction point; said network being connected across said voltage input, wherein said semiconductor switch network comprises a plurality of pairs of said first and second switches, each pair associated with one of said load capacitors; and
   a charging capacitor network connected across said semiconductor switch network and across said voltage input, and comprising a charging capacitance and an inductance connected between said switch junction point and said output circuit, wherein said charging capacitor network comprises a plurality of charging capacitors each associated with one of said load capacitors;
   said method comprising charging said load capacitance by said charging capacitance when a first switch of said semiconductor switch network is closed and a second switch of said semiconductor switch network is open and discharging said load capacitance by said inductance when said first switch is closed and said second switch is open, wherein each of said load capacitors is charged by said associated charging capacitors when said associated first switch is closed and said associated second switch is open.

10. The method of claim 9 wherein said first and second switches are connected in series at said switch junction point.

11. The method of claim 10 wherein said charging capacitor network is connected across said first and second switches.

12. The method of claim 9 wherein each charging capacitor is connected across said associated pair of first and second switches.

13. The method of claim 12 wherein said first and second switches of each pair of are connected in series.

14. The method of claim 13 wherein each charging capacitor is connected across said associated switch pair.

* * * * *